US010843756B2

(12) United States Patent
Matsuo

(10) Patent No.: US 10,843,756 B2
(45) Date of Patent: Nov. 24, 2020

(54) VEHICLE BODY COVER STRUCTURE FOR SADDLED VEHICLE

(71) Applicant: HONDA MOTOR CO., LTD., Minato (JP)

(72) Inventor: Tomoya Matsuo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/698,177

(22) Filed: Sep. 7, 2017

(65) Prior Publication Data
US 2018/0072363 A1 Mar. 15, 2018

(30) Foreign Application Priority Data

Sep. 9, 2016 (JP) ................... 2016-177144

(51) Int. Cl.
B62J 17/00 (2020.01)
B62K 11/04 (2006.01)
B62D 29/04 (2006.01)
B62D 25/02 (2006.01)
B62D 25/08 (2006.01)

(52) U.S. Cl.
CPC ............ B62J 17/00 (2013.01); B62D 29/04 (2013.01); B62K 11/04 (2013.01); B62D 25/02 (2013.01); B62D 25/084 (2013.01)

(58) Field of Classification Search
CPC .......... B62J 17/00; B62D 29/04; B62D 25/02; B62D 25/084; B62K 11/04
USPC ....................................................... 296/77.1
See application file for complete search history.

(56) References Cited

U.S. PATENT DOCUMENTS 9,199,683 B2 * 12/2015 Kitagawa ................. B62J 17/04
2015/0060178 A1 * 3/2015 Matsushima .......... F02M 35/162
180/219

FOREIGN PATENT DOCUMENTS

DE   33 10 918 A1    10/1984
DE     3310918 A1  * 10/1984 .............. B62J 17/00
JP   S60-174371 A     9/1985
JP   2002-284038 A   10/2002
(Continued)

OTHER PUBLICATIONS

Extended European Search Report dated Jan. 31, 2018 issued over the corresponding EP Patent Application 17 18 9804.2.
(Continued)

Primary Examiner — Joseph D. Pape
Assistant Examiner — Dana D Ivey
(74) Attorney, Agent, or Firm — Carrier Blackman & Associates, P.C.; William D. Blackman; Joseph P. Carrier

(57) ABSTRACT

To provide a vehicle body cover structure for a saddled vehicle, capable of achieving restrictive improvements on rigidity of the vehicle body cover. A vehicle body cover structure for a saddled vehicle includes a radiator shroud formed of a fiber-reinforced resin covering an outside of a vehicle body. The fiber-reinforced resin is formed of a cloth woven from warp threads and filling threads formed of fibers. In the vehicle body cover structure, the radiator shroud has the cloth disposed thereon. The cloth has disposed thereon a bisector that divides an angle formed between the warp threads and the filling threads into two equal parts. The bisector is disposed so as to extend along a line segment that connects between a third mounting portion to be fixed to a vehicle body side and a front end portion that is farthest from the third mounting portion.

9 Claims, 9 Drawing Sheets

(56) References Cited

FOREIGN PATENT DOCUMENTS

| JP | 2013-189171 A | 9/2013 |
|----|---------------|--------|
| JP | 2015-189328 A | 11/2015 |

OTHER PUBLICATIONS

Office Action dated Jun. 26, 2018 in the corresponding Japanese Patent Application No. 2016-177144 with the English machine translation thereof.
Japanese Office Action, Notification of Reasons for Refusal, with the English machine translation thereof, dated Feb. 7, 2019, and issued in the corresponding JP Patent Application No. 2016-177144.
For Honda CRM250AR Shroud and Drip. Racing Products, Japan, [online], Dec. 17, 2008, the Internet, URL, https://dripro.exblog.jp/9922279/.
European Office Action dated Apr. 24, 2019, issued to corresponding EP Patent Application 17 189 804.2.
Nn: "Grundlagen Faserverbundwerkstoffe", Sep. 7, 2004, XP055579441, retrieved from the Internet: URL:http://bibliothek.fzk.de/zb/berichte/FZKA6552Kapitel/FZKA6552Kap.2.pdf.
Japanese Office Action, Notification of Reasons for Refusal, with the English machine translation thereof, dated Feb. 5, 2019, and issued in the corresponding JP Patent Application No. 2016-1771442.
Office Action dated Oct. 11, 2019 to the corresponding European patent application No. 17 189 804.2.

\* cited by examiner

FIG.8
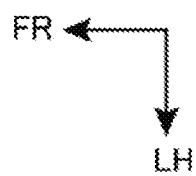
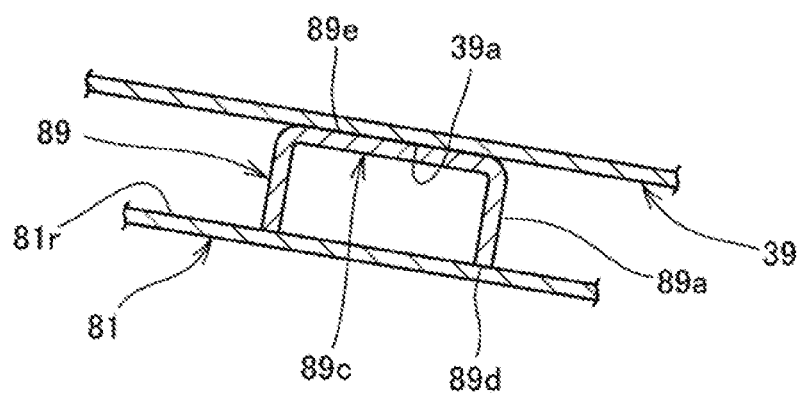

VEHICLE BODY COVER STRUCTURE FOR SADDLED VEHICLE

The present application claims priority under 35 U.S.C. § 119 to Japanese Patent Application No. 2016-177144 filed on Sep. 9, 2016. The content of the application is incorporated herein by reference in its entirety.

TECHNICAL FIELD

The present invention relates to a vehicle body cover structure for a saddled vehicle.

BACKGROUND ART

A known fiber-reinforced plastic (FRP) automotive panel includes a FRP skin layer in which reinforced fibers are disposed in predetermined directions and a stiffener having a FRP single-skin structure (see, for example, Patent Document 1).

PRIOR ART DOCUMENT

Patent Document

[Patent Document 1]
Japanese Patent Laid-Open No. 2002-284038

SUMMARY OF THE INVENTION

Problem to be Solved by the Invention

The automotive panel disclosed in Patent Document 1 includes the FRP skin layer and the stiffener to thereby achieve improved torsional rigidity and bending rigidity of the panel. In a saddled vehicle, however, excessively high rigidity of a vehicle body cover may affect, for example, durability of the vehicle body cover and vehicle running performance. A need thus exists for restrictive improvements on the vehicle body cover rigidity.

An object of the present invention is to provide a vehicle body cover structure for a saddled vehicle, capable of achieving restrictive improvements on rigidity of the vehicle body cover.

Means for Solving the Problem

To achieve the foregoing object, a first aspect of the present invention provides a vehicle body cover structure for a saddled vehicle, including vehicle body covers (50, 51) formed of a fiber-reinforced resin covering an outside of a vehicle body. The fiber-reinforced resin is formed of a cloth (69) woven from warp threads (69a) and filling threads (69b) formed of fibers. In the vehicle body cover structure, the vehicle body covers (50, 51) have the cloth (69) disposed thereon. The cloth (69) has disposed thereon a bisector (69c) that divides an angle formed between the warp threads (69a) and the filling threads (69b) into two equal parts. The bisector (69c) is disposed so as to extend along line segments (78, 99) that connect between fixing portions (56t, 81p) to be fixed to a vehicle body side and vehicle body cover end portions (56v, 81q) that are farthest from the fixing portions (56t, 81p).

A second aspect of the present invention provides a vehicle body cover structure for a saddled vehicle, including vehicle body covers (50, 51) formed of a fiber-reinforced resin covering an outside of a vehicle body. The fiber-reinforced resin is formed of a cloth (69) woven from warp threads (69a) and filling threads (69b) formed of fibers. In the vehicle body cover structure, the vehicle body covers (50, 51) have surfaces (56y, 81y) that extend in a longitudinal direction of the vehicle body covers (50, 51). The cloth (69) is disposed on the vehicle body covers (50, 51) such that the bisector (69c) that divides an angle formed between the warp threads (69a) and the filling threads (69b) into two equal parts and that is disposed on the cloth (69) extends in the longitudinal direction of the surfaces (56y, 81y).

In a third aspect, the vehicle body cover is a radiator shroud (50) that covers an outside of a radiator (41). The radiator shroud (50) includes, at a rear portion thereof, the fixing portion (56t) to be fixed to the vehicle body side and has, at a position spaced away downwardly toward a front from the fixing portion (56t), the vehicle body cover end portion (56v) as a free end.

In a fourth aspect, the vehicle body cover is a side cover (51) disposed at a position below a lateral portion of a seat (13). The side cover (51) includes, at an upper portion thereof, the fixing portion (81p) to be fixed to the vehicle body side, extends from the fixing portion (81p) upwardly toward a rear to thereby cover outsides of mufflers (38, 39), and has, at a position spaced away upwardly toward the rear from the fixing portion (81p), the vehicle body cover end portion (81q) as a free end.

In a fifth aspect, the vehicle body cover is a side cover (51) disposed at a position below a lateral portion of a seat (13). The side cover (51) includes, at an upper portion thereof, the fixing portion (81p) to be fixed to the vehicle body side, extends from the fixing portion (81p) upwardly toward a rear to thereby cover outsides of mufflers (38, 39), and defines the surface (81y) extending from the fixing portion (81p) upwardly toward the rear as the surface (81y) extending in the longitudinal direction.

In a sixth aspect, the side cover (51) includes, at an upper portion of a front end portion thereof, a front end fixing portion (81n) to be fixed to the vehicle body side and has the cloth (69) disposed thereon, the cloth (69) having disposed thereon an orthogonal bisector (69d) that extends in a direction extending downwardly toward the rear from the fixing portion (81p) and that is orthogonal to the bisector (69c).

Effects of the Invention

In accordance with the first and second aspects of the present invention, rigidity of the vehicle body covers can be prevented from excessively increasing, while enhancing strength of the vehicle body covers through the use of the fiber-reinforced resin, so that durability of the vehicle body covers and vehicle running performance can be improved.

In accordance with the third aspect, deformation of a portion in the radiator shroud on the side closer to the vehicle body cover end portion relative to the fixing portion can be promoted when an external force is applied to the portion on the side closer to the vehicle body cover end portion relative to the fixing portion. Thus, durability can be improved even when an external force is repeatedly applied to the portion on the side closer to the vehicle body cover end portion relative to the fixing portion.

In accordance with the fourth aspect, deformation of a portion in the side cover on the side closer to the vehicle body cover end portion relative to the fixing portion can be promoted when an external force is applied to the portion on the side closer to the vehicle body cover end portion relative to the fixing portion. Thus, durability can be improved even when an external force is repeatedly applied to the portion on the side closer to the vehicle body cover end portion relative to the fixing portion.

In accordance with the fifth aspect, rigidity of the side cover can be prevented from increasing excessively when flexure occurs in the longitudinal direction of the side cover, so that durability of the side cover can be enhanced.

The sixth aspect results in the orthogonal bisector being disposed in the direction in which the side cover tends to flex, so that the side cover can readily flex for the enhanced durability.

BRIEF DESCRIPTION OF THE DRAWINGS

FIG. 8 is a cross-sectional view taken along line VIII-VIII in FIG. 6.

MODE FOR CARRYING OUT THE INVENTION

Figure 1:
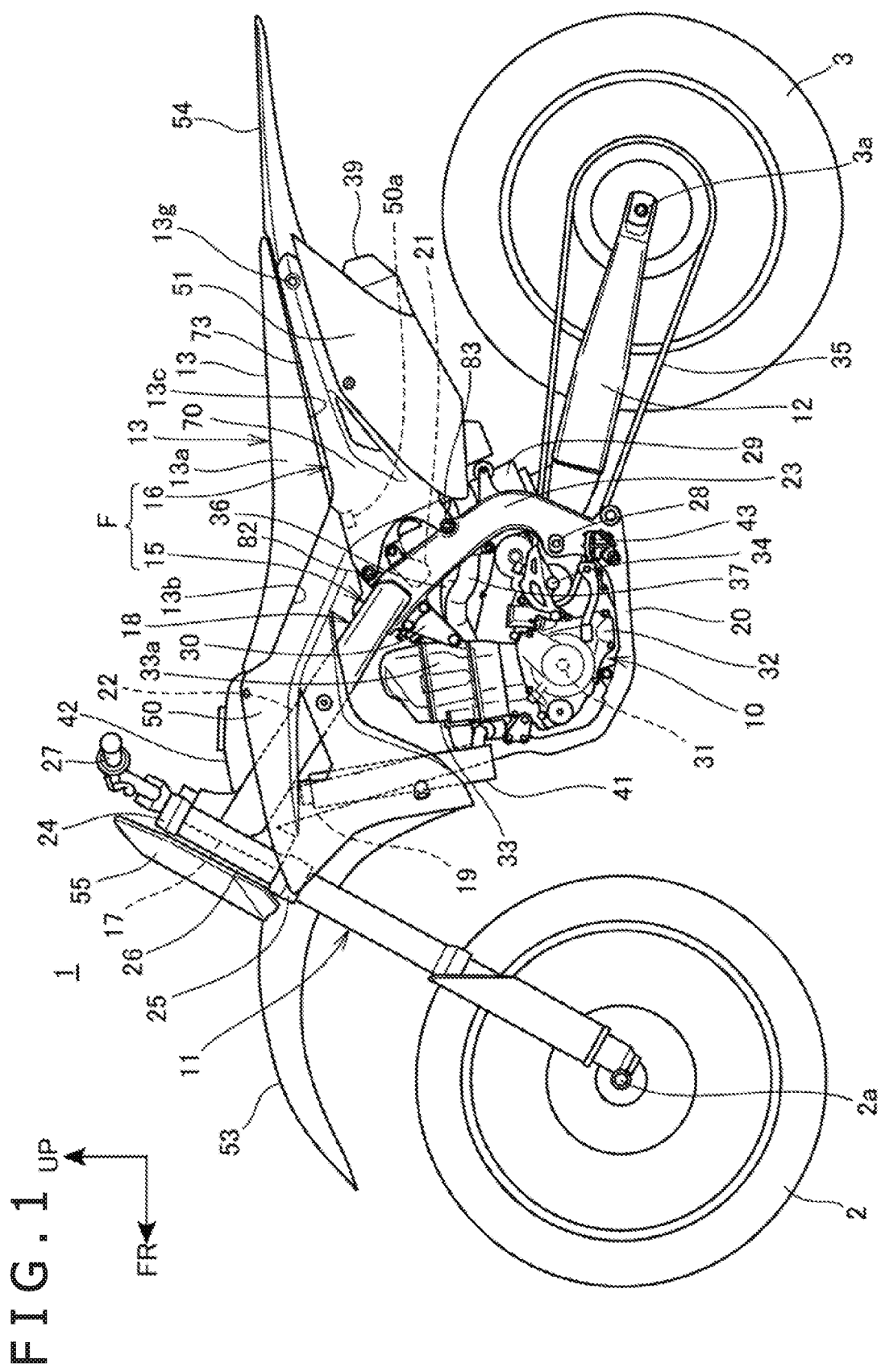
FIG. 1 is a left side elevational view of a motorcycle according to an embodiment of the present invention.

An embodiment of the present invention will be described below with reference to the accompanying drawings. Throughout the descriptions given hereunder, expressions indicating directions including front and rear (anterior and posterior), right and left, and upper and lower (superior and inferior) mean the same directions as those in a vehicle unless otherwise specified. In the drawings, an arrow FR indicates forward of the vehicle, an arrow UP indicates upward of the vehicle, and an arrow LH indicates leftward of the vehicle.

Figure 2:
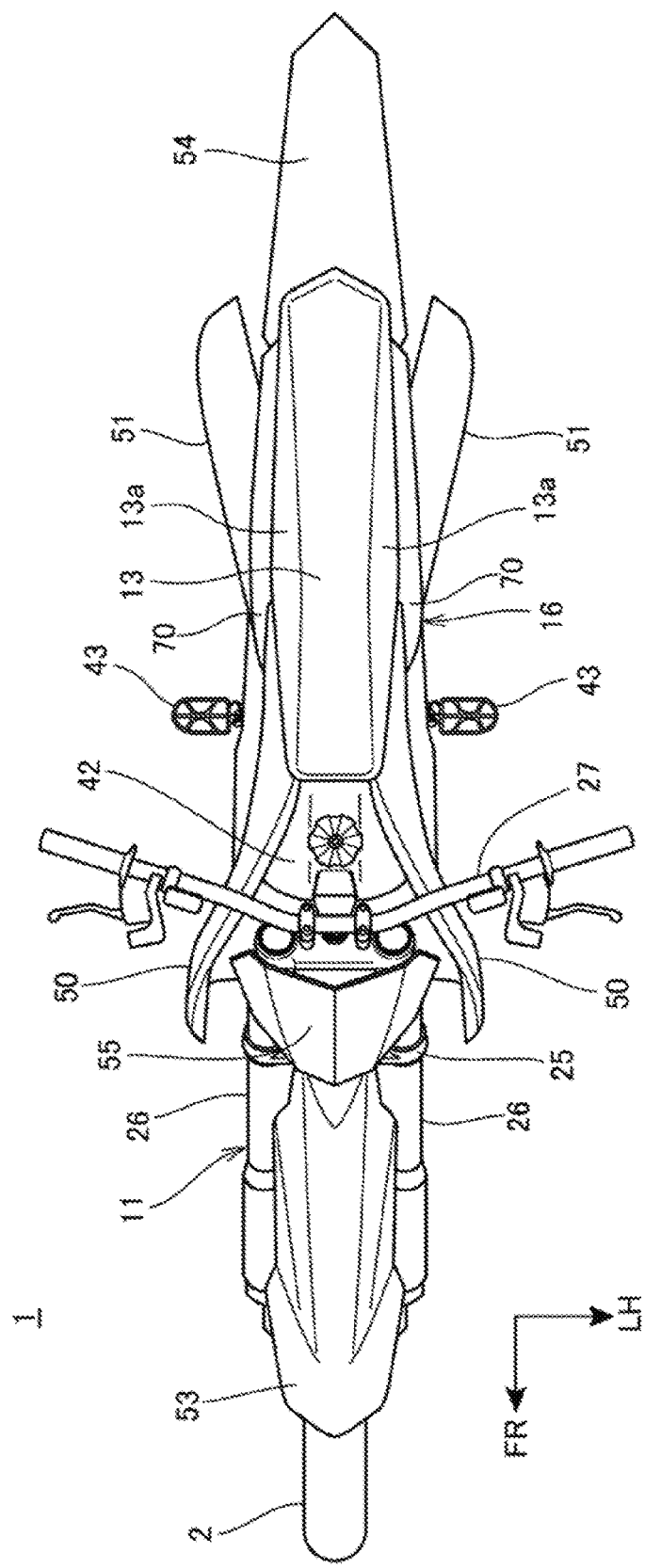
FIG. 2 is a plan view of the motorcycle.

FIG. 1 is a left side elevational view of a motorcycle 1 according to the embodiment of the present invention. FIG. 2 is a plan view of the motorcycle 1. It is noted that, in FIG. 1, elements provided in pairs on the left and right sides are represented by only the left element including the corresponding reference symbols.

The motorcycle 1 includes an engine 10 as a power unit supported on a vehicle body frame F. The motorcycle 1 further includes a front fork 11 and a rear fork 12. The front fork 11 that steerably supports a front wheel 2 is supported steerably at a front end of the vehicle body frame F. The rear fork 12 that supports a rear wheel 3 is disposed on the side of a rear portion of the vehicle body frame F. The motorcycle 1 is a saddled vehicle including a seat 13 disposed at an upper portion in the rear portion of the vehicle body frame F. A rider straddles and sits in the seat 13.

The vehicle body frame F includes a front frame 15 and a rear frame 16. The front frame 15 supports the engine 10 as an internal combustion engine. The rear frame 16 extends toward the rear from the front frame 15.

The front frame 15 includes a head pipe 17 disposed at a front end, a pair of left and right main frames 18, a down frame 19, a pair of left and right lower frames 20, and a cross frame 21 that connects the main frames 18 in a vehicle width direction. The front frame 15 is, for example, formed of a metal such as an aluminum alloy and is thus conductive.

Specifically, the main frames 18 integrally include a pair of left and right main tubes 22 and a pair of left and right pivot frames 23. The main tubes 22 extend downwardly toward the rear from a rear surface of the head pipe 17. The pivot frames 23 extend downwardly toward the rear from rear ends of the main tubes 22 at a sharper inclination angle than the main tubes 22. Front end portions of the main frames 18 extend downwardly toward the rear with an increasing width in the vehicle width direction toward the rear. Rear portions of the main frames 18 extend downwardly toward the rear substantially in parallel with each other.

The down frame 19 has an upper end portion connected with lower portions of the main frames 18 at a rear portion of the head pipe 17 and at the front end portions of the main frames 18. The down frame 19 extends downwardly toward the rear at a sharper inclination angle than the main frames 18. The down frame 19 is a single frame extending at a center in the vehicle width direction.

The pivot frames 23 extend downwardly from rear ends of the main tubes 22 at a greater inclination angle than the main tubes 22. The cross frame 21 connects upper end portions of the pivot frames 23 in the vehicle width direction.

The lower frames 20 branches in left and right portions and extend downwardly from a lower end portion of the down frame 19. The lower frames 20 then bend and extend rearwardly before being connected with lower end portions of the pivot frames 23.

The rear frame 16 has a front end portion connected with the rear portions of the main frames 18 and extends rearwardly.

The front fork 11 includes a steering shaft (not depicted), a top bridge 24, a bottom bridge 25, and a pair of fork tubes 26. The steering shaft is journaled on the head pipe 17. The top bridge 24 is fixed to an upper end of the steering shaft. The bottom bridge 25 is fixed to a lower end of the steering shaft. The fork tubes 26 are disposed on both lateral sides of the head pipe 17 and supported by the top bridge 24 and the bottom bridge 25.

The front wheel 2 is journaled on a front wheel axle 2a disposed at lower end portions of the fork tubes 26. A handlebar 27 used by the rider to steer the front wheel 2 is disposed at the top bridge 24.

The rear fork 12 formed into an arm shape extending rearwardly has a front end portion journaled by a pivot shaft 28 that connects rear end portions of the left and right pivot frames 23 in the vehicle width direction. The rear fork 12 thereby swing vertically about the pivot shaft 28. The rear wheel 3 is journaled by a rear wheel axle 3a that is passed through a rear end portion of the rear fork 12.

A rear suspension 29 is disposed across a front portion of the rear fork 12 and the cross frame 21.

The engine 10 is disposed inside, and supported by, the front frame 15 that is formed into a frame shape in a side view. An engine hanger 30 that extends downwardly toward the front is fixed at a vertically intermediate portion of the main frames 18.

The engine 10 includes a crankcase 32 and a cylinder portion 33. The crankcase 32 supports a crankshaft 31 that extends in the vehicle width direction. The cylinder portion 33 extends upwardly from a front portion of the crankcase 32. A transmission (not depicted) is built into a rear portion of the crankcase 32. The engine 10 is a water-cooled type.

The engine hanger 30 has a front end portion connected with a rear portion of a cylinder head 33a of the cylinder portion 33.

Output from the engine 10 is transmitted to the rear wheel 3 by a chain 35 that is wound across an output shaft 34 of the transmission of the engine 10 and the rear wheel 3.

An exhaust pipe of the engine 10 is withdrawn to the front from an exhaust port at a front surface of the cylinder head 33a and extends toward a first side (right side) in the vehicle width direction. The exhaust pipe then bends to the rear and extends to the rear by way of a right lateral side of the cylinder portion 33. The exhaust pipe is bifurcated into a one-side exhaust pipe 36 on the right and another-side exhaust pipe 37 on the left in rear of the cylinder portion 33. The one-side exhaust pipe 36 (see FIG. 4) extends along the right-hand side of the vehicle body toward the rear and is connected with a one-side muffler 38 (see FIG. 7). The other-side exhaust pipe 37 extends along the left-hand side of the vehicle body toward the rear and is connected with another-side muffler 39. The one-side muffler 38 and the other-side muffler 39 are disposed on the right-hand side and the left-hand side, respectively, of the rear wheel 3 above the rear wheel 3.

The motorcycle 1 includes a pair of left and right plate-shaped radiators 41 that radiate heat of coolant of the engine 10. The radiators 41 are disposed separately on left and right lateral sides of the down frame 19 at a position anterior to the cylinder portion 33. The radiators 41 are disposed in upright positions such that heat radiating surfaces thereof as surfaces in thickness directions face to the front of the motorcycle 1.

A fuel tank 42 is disposed between the head pipe 17 and the seat 13, and between the left and right main frames 18 and is supported by the main frames 18. The fuel tank 42 has an upper portion bulging upwardly above upper surfaces of the main frames 18.

The seat 13 extends from a rear portion of the fuel tank 42 toward the rear along an upper surface of the rear frame 16. The seat 13 is supported from below by the fuel tank 42 and the rear frame 16.

Steps 43 on which the rider rests his or her feet are provided in a pair of left and right at lower end portions of the pivot frames 23.

The motorcycle 1 includes, as a vehicle body cover for covering the vehicle body, a pair of left and right radiator shrouds 50 and a pair of left and right side covers 51.

The radiator shrouds 50 assume plate-shaped covers that cover the radiators 41, the upper portion of the down frame 19, the main tubes 22, and the fuel tank 42 from lateral outer sides. The radiator shrouds 50 are fixed to the radiators 41, the main tubes 22, and the fuel tank 42 by fixing members.

The side covers 51 cover the one-side muffler 38 and the other-side muffler 39, individually, from outer lateral sides. The side covers 51 are mounted on an outer lateral surface of the rear frame 16.

The radiator shrouds 50 and the side covers 51 are formed of a fiber-reinforced resin.

As depicted in FIGS. 1 and 2, the seat 13 has two lateral surface portions 13a in the vehicle width direction. The lateral surface portions 13a are inclined such that the seat 13 has a greater size in the vehicle width direction at lower portions. The lateral surface portions 13a join smoothly outer lateral surfaces of rear portions of the radiator shrouds 50 and outer lateral surfaces of the rear frame 16. This arrangement prevents the rider sitting in the seat 13 from being caught by a step and allows the rider to easily change a riding position.

Additionally, the motorcycle 1 includes a front fender 53, a rear fender 54, and a front cover 55. The front fender 53 is mounted on the front fork 11 and covers the front wheel 2 from above. The rear fender 54 covers the rear wheel 3 from above. The front cover 55 covers upper portions of the fork tubes 26 from the front side.

The front fender 53 and the front cover 55 are formed of a resin, for example, polypropylene.

Figure 3:
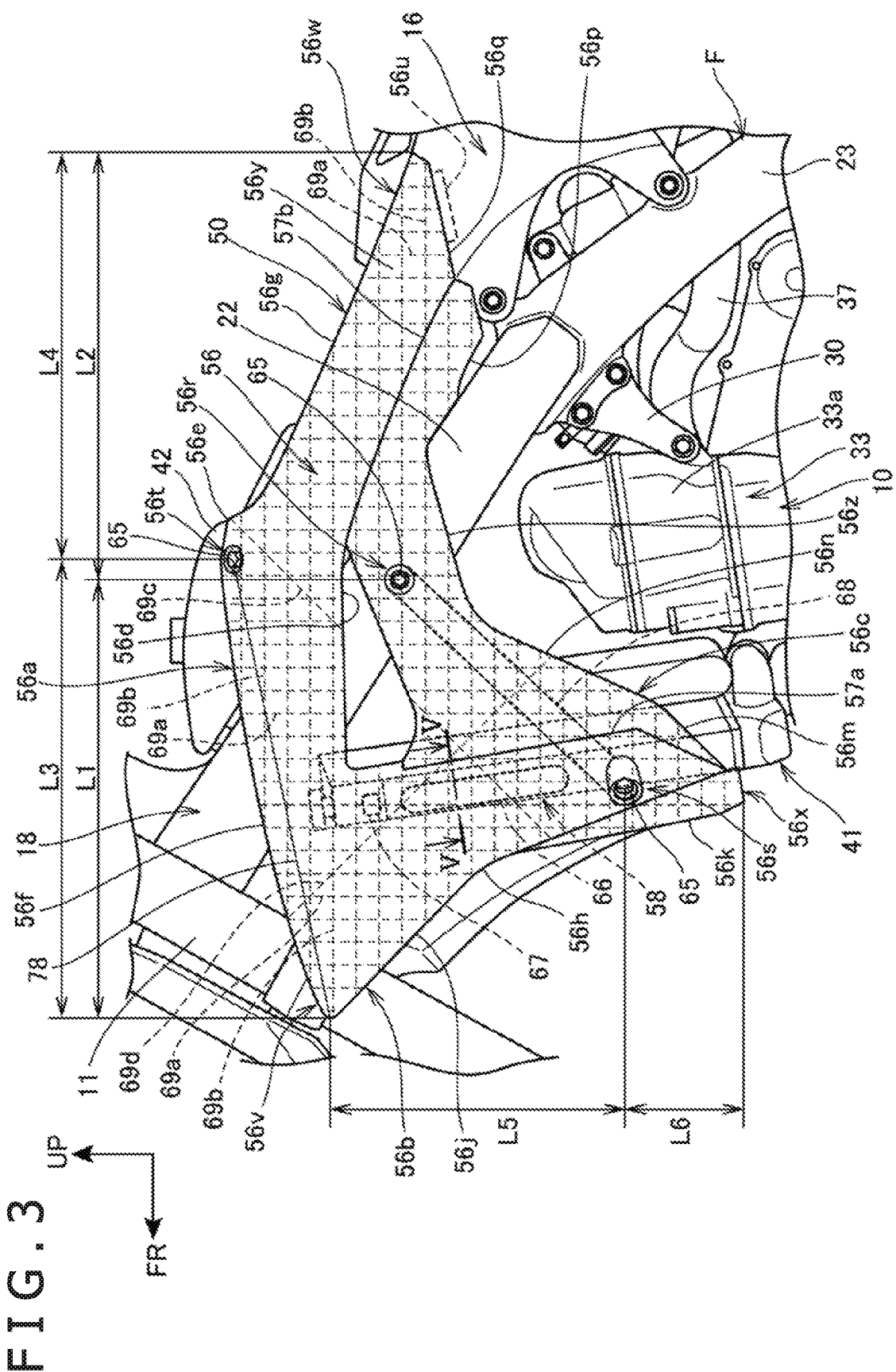
FIG. 3 is an enlarged view of a main part of the motorcycle in FIG. 1.

FIG. 3 is an enlarged view of a main part of the motorcycle 1 in FIG. 1.

The radiator shroud 50 is mounted on the main frame 18, the rear frame 16, the radiator 41, and the fuel tank 42 to thereby cover the main frame 18, the rear frame 16, the radiator 41, and the fuel tank 42 from the lateral side.

The radiator shroud 50 includes a shroud main unit 56 and a protrusion 58. The protrusion 58 is bonded by adhesion to a rear surface of the shroud main unit 56.

The shroud main unit 56 is formed in a side view into a substantially triangular shape having an upper hem 56a, a front hem 56b, and a lower hem 56c. The shroud main unit 56 has a center opening 56d formed at a substantially central portion of the triangle. The upper hem 56a includes an upper hem bent portion 56e, a front upper hem 56f, and a rear upper hem 56g. The upper hem bent portion 56e is bent at a central portion of the upper hem 56a so as to protrude upwardly. The front upper hem 56f extends from the upper hem bent portion 56e downwardly toward the front. The rear upper hem 56g extends from the upper hem bent portion 56e downwardly toward the rear.

The front hem 56b includes a front hem bent portion 56h, an upper front hem 56j, and a lower front hem 56k. The front hem bent portion 56h is bent at a central portion of the front hem 56b so as to be recessed. The upper front hem 56j extends from the front hem bent portion 56h upwardly. The lower front hem 56k extends from the front hem bent portion 56h downwardly. The lower hem 56c includes a front lower hem 56m, a central first lower hem 56n, a central second lower hem 56z, a rear first lower hem 56p, and a rear second lower hem 56q. The front lower hem 56m extends upwardly toward the rear. The central first lower hem 56n extends from a rear end of the front lower hem 56m upwardly toward the rear at an angle smaller than the front lower hem 56m. The central second lower hem 56z extends from a rear end of the central first lower hem 56n upwardly toward the rear at an angle smaller than the central first lower hem 56n. The rear first lower hem 56p extends from a rear end of the central second lower hem 56z downwardly toward the rear. The rear second lower hem 56q extends from the rear first lower hem 56p upwardly toward the rear.

The shroud main unit 56 includes a first mounting portion 56r, a second mounting portion 56s, and a third mounting portion 56t. The first mounting portion 56r is formed between the center opening 56d and the central second lower hem 56z. The second mounting portion 56s is formed at a position posterior to the lower front hem 56k. The third mounting portion 56t is formed at a position below the upper hem bent portion 56e. The first mounting portion 56r is attached at an intermediate portion of the main frame 18 in an anterior-posterior direction, the second mounting portion 56s is attached to a position below the radiator 41, and the third mounting portion 56t is attached to a position above the fuel tank 42 by respective bolts 65. Additionally, the rear second lower hem 56q of the shroud main unit 56 includes an engagement protrusion 56u formed thereon. The engagement protrusion 56u protrudes downwardly and is inserted in, and engaged with, a slit (not depicted) in a front portion of the rear frame 16.

In addition, the shroud main unit 56 has a front end portion 56v that assumes a free end not fixed to the vehicle body side and is disposed to be spaced apart to an outer lateral side from the front fork 11.

A distance L1 in the anterior-posterior direction between the first mounting portion 56r and the front end portion 56v is substantially equal to a distance L2 in the anterior-posterior direction between the first mounting portion 56r and a rear end portion 56w.

A distance L3 in the anterior-posterior direction between the third mounting portion 56t and the front end portion 56v is substantially equal to a distance L4 in the anterior-posterior direction between the third mounting portion 56t and the rear end portion 56w.

Additionally, a distance L5 in a superior-inferior direction between the second mounting portion 56s and the front end portion 56v is longer than a distance L6 in the superior-inferior direction between the second mounting portion 56s and a lower end portion 56x. Additionally, relations of L1>L5 and L3>L5 hold.

Through the foregoing arrangements, the front end portion 56v of the shroud main unit 56 is spaced widely apart toward the front from the first mounting portion 56r and the second mounting portion 56s and is spaced widely apart upwardly from the third mounting portion 56t. As a result, an external force acting in the shroud main unit 56 on a position anterior to the first mounting portion 56r and the second mounting portion 56s and superior to the third mounting portion 56t tends to produce flexure in the shroud main unit 56.

The protrusion 58 includes a first protrusion 66, a second protrusion 67, and a third protrusion 68. The first protrusion 66 and the second protrusion 67 constitute a plurality of protrusions abutted on a lateral surface of the radiator 41. The third protrusion 68 connects between the first mounting portion 56r and the second mounting portion 56s.

The first protrusion 66 and the second protrusion 67 are disposed so as to overlap the radiator 41 in a side view. The first protrusion 66 is formed to be longitudinally long to follow along the lateral surface of the radiator 41. The second protrusion 67 is formed into a rectangle and disposed above the first protrusion 66.

The third protrusion 68 is formed to extend upwardly toward the rear and functions to reinforce a part between the first mounting portion 56r and the second mounting portion 56s of the shroud main unit 56.

The shroud main unit 56, though formed integrally, has projection or recessed lines 57a and 57b formed on a surface 56y on the obverse side. The line 57a extends from a front end of the center opening 56d to the lower end portion 56x of the shroud main unit 56. The line 57b extends from a rear end of the center opening 56d to the rear second lower hem 56q. This arrangement makes design of the shroud main unit 56 novel, enhancing product attractiveness of the motorcycle 1. The lines 57a and 57b, when projection, serve as reinforcement ribs, so that rigidity of the shroud main unit 56 can be enhanced.

The shroud main unit 56 is formed of a fiber-reinforced resin (FRP), for example, a carbon fiber-reinforced resin (CFRP).

The CFRP is a composite material made of carbon fibers and resin. The CFRP is, for example, is a cloth 69 (see FIG. 9) woven from warp threads and filling threads that are carbon fibers bundled together, impregnated with a resin, and heated and cured. Examples of the resin includes a thermoplastic resin and a thermosetting resin.

The CFRP is illustrative only and a FRP (fiber-reinforced resin) using other types of fibers may be used.

The broken lines extending in the anterior-posterior direction and the superior-inferior direction in the shroud main unit 56 each represent a warp thread 69a and a filling thread 69b formed of a carbon fiber. A bisector 69c is drawn with a broken line so as to divide an angle formed between the warp thread 69a and the filling thread 69b into two equal parts.

Draw a line segment 78 that connects between the front end portion 56v of the shroud main unit 56 and the third mounting portion 56t that is the farthest from the front end portion 56v among the first mounting portion 56r, the second mounting portion 56s, and the third mounting portion 56t. The bisector 69c is disposed so as to extend along the line segment 78. The direction in which the line segment 78 extends corresponds to the longitudinal direction of the shroud main unit 56. Thus, the bisector 69c is disposed to extend along the longitudinal direction of the shroud main unit 56.

Disposing the bisector 69c as described above allows rigidity of the shroud main unit 56 to be prevented from increasing excessively in the direction extending along the bisector 69c, so that the shroud main unit 56 can be made to tend to flex in the direction extending along the bisector 69c. Fatigue strength can thus be enhanced when an external force repeatedly acts on the shroud main unit 56.

Another bisector different from the bisector 69c, specifically, a bisector 69d is drawn with a broken line so as to divide the angle formed between the warp thread 69a and the filling thread 69b into two equal parts. The bisector 69d is orthogonal to the bisector 69c. With respect to the direction extending along the bisector 69d of the shroud main unit 56, too, the rigidity of the shroud main unit 56 can be prevented from increasing excessively and the shroud main unit 56 can be made to tend to flex in the direction extending along the bisector 69d for the enhanced fatigue strength.

Figure 4:
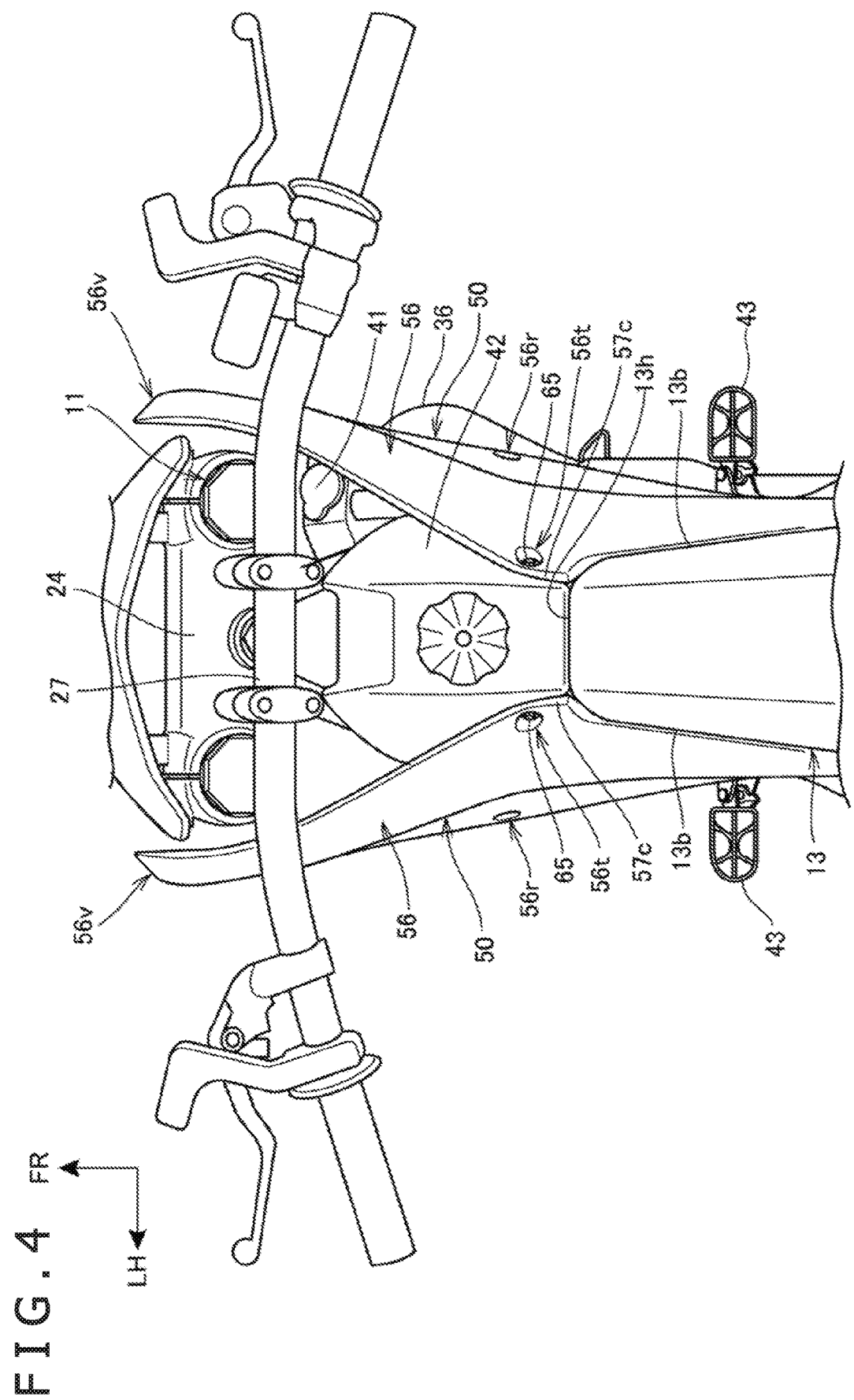
FIG. 4 is a plan view depicting a front part of the motorcycle.

FIG. 4 is a plan view depicting a front part of the motorcycle 1.

The left and right radiator shrouds 50 cover lower portions of the two lateral portions of the seat 13 and upper portions of the fuel tank 42 and the front fork 11 from lateral sides. The left and right radiator shrouds 50 have rear portions extending substantially in the anterior-posterior direction along outer lateral sides of the seat 13. The radiator shrouds 50 have portions anterior to the rear portions bulging outwardly in the vehicle width direction toward the front of the vehicle. Specifically, an upper edge 57c of the shroud main unit 56 is formed to follow along a front lower edge 13b of the seat 13 in a lateral portion of the seat 13. The upper edge 57c extends to follow partly along the seat 13 from the front lower edge 13b toward a front edge 13h of the seat 13 before gradually moving to the outside in the vehicle width direction toward the front.

The front end portions 56v of the left and right radiator shrouds 50 extend from the front fork 11 up to positions spaced apart outwardly in the vehicle width direction. Specifically, because the front end portions 56v are disposed at outermost positions in the vehicle width direction in the radiator shrouds 50, an external force tends to act repeatedly on the front end portions 56v of the radiator shrouds 50 from lateral sides of the vehicle.

In a plan view, the first mounting portion 56r and the third mounting portion 56t of the shroud main unit 56 are disposed laterally of the fuel tank 42 and areas around the first mounting portion 56r and the third mounting portion 56t of the shroud main unit 56 are clamped by legs of the rider. Thus, the areas protrude less laterally to thus offer high rigidity.

In the present embodiment, the shroud main unit 56 is formed of a FRP, e.g., CFRP to achieve enhanced strength when, as described above, an external force acts repeatedly on the side of the front end portion 56v of the shroud main unit 56. Moreover, the present embodiment allows for the direction of fibers for greater flexibility to achieve enhanced durability.

Figure 5:
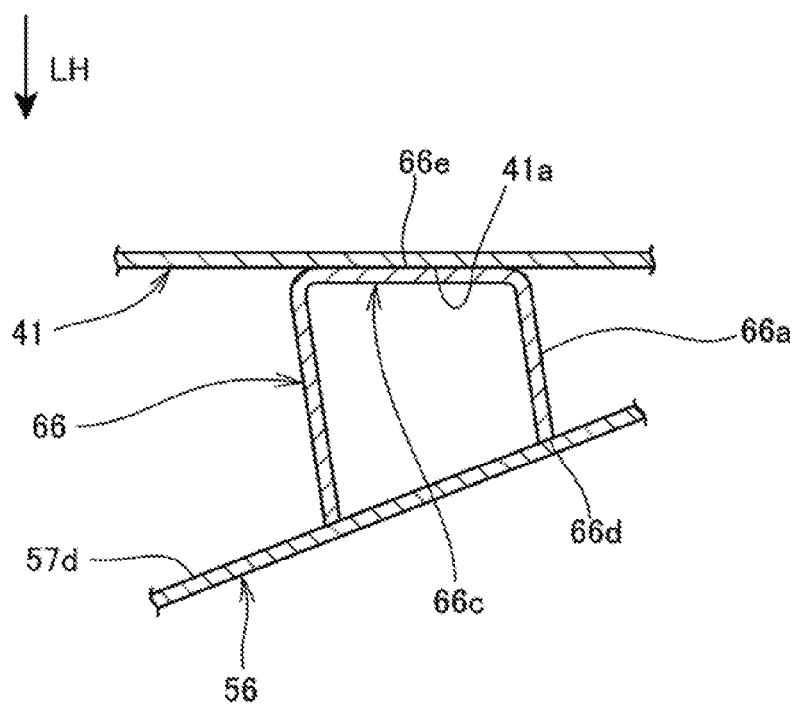
FIG. 5 is a cross-sectional view taken along line V-V in FIG. 3.

FIG. 5 is a cross-sectional view taken along line V-V in FIG. 3, depicting a cross section of the first protrusion 66.

The first protrusion 66 is a hollow structure having an outer peripheral wall 66a and an inner wall 66c formed integrally with each other. The outer peripheral wall 66a is bonded with a back surface 57d of the shroud main unit 56. The inner wall 66c is disposed on an inner edge on the inside in the vehicle width direction of the outer peripheral wall 66a.

An outer edge 66d on the outside in the vehicle width direction of the outer peripheral wall 66a is bonded with the back surface 57d of the shroud main unit 56. The inner wall 66c has an abutment surface 66e that is brought into abutment with an outer lateral surface 41a of the radiator 41. Having the abutment surface 66e allows a surface pressure between the outer lateral surface 41a of the radiator 41 and the abutment surface 66e to be reduced, so that the abutment surface 66e can be prevented from being deformed or worn.

Additionally, the first protrusion 66, because of the hollow structure, can be built lightweight and built to offer high rigidity and high heat insulting performance.

The first protrusion 66 is formed of the CFRP as with the shroud main unit 56.

It is noted that the second protrusion 67 and the third protrusion 68 depicted in FIG. 3 have a basic structure identical to a basic structure of the first protrusion 66, though having dimensions slightly different from dimensions of the first protrusion 66.

Figure 6:
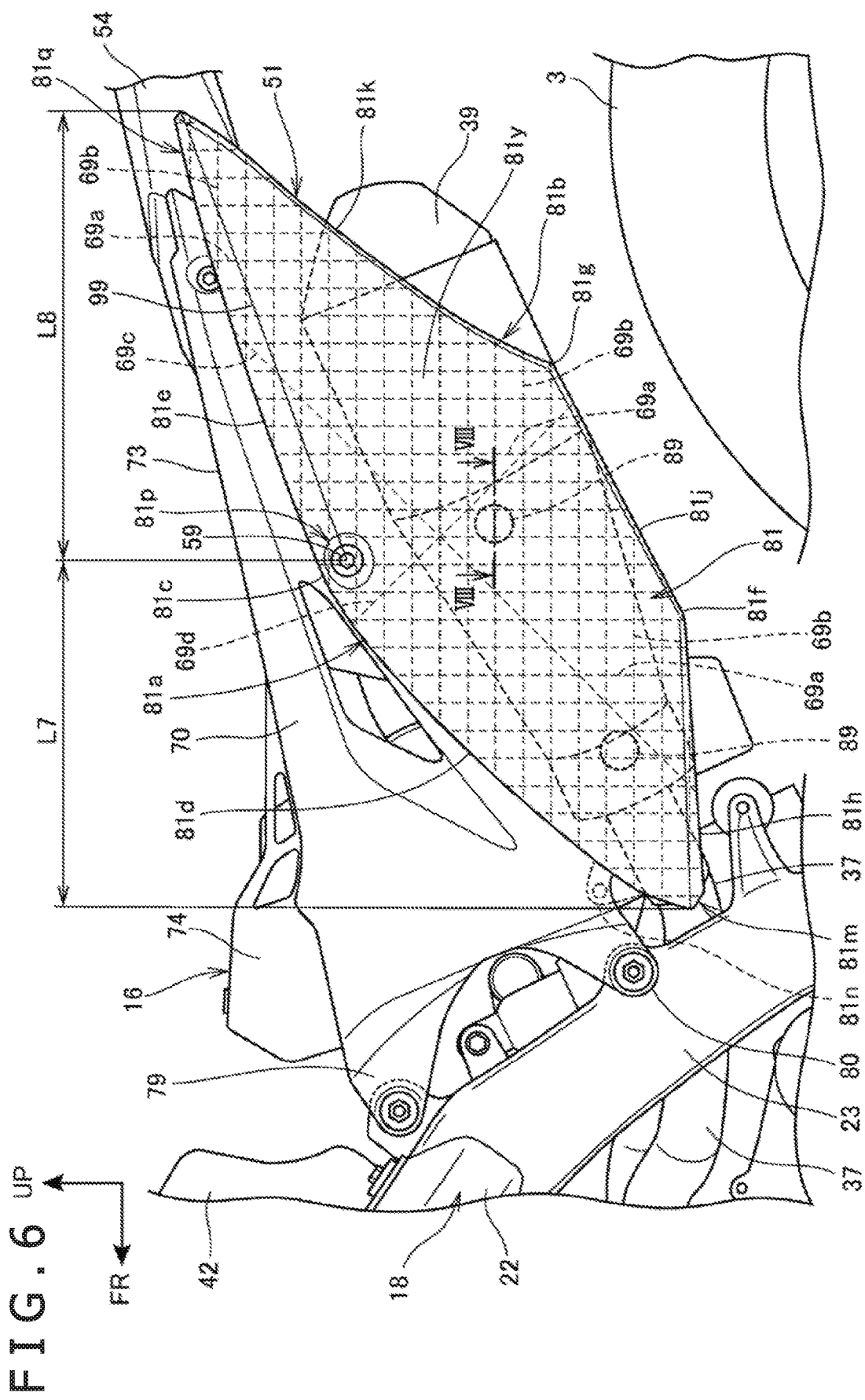
FIG. 6 is a left side elevational view depicting a rear part of the motorcycle.

FIG. 6 is a left side elevational view depicting a rear part of the motorcycle 1.

FIG. 6 depicts a condition of the motorcycle 1 from which the seat 13 has been removed.

The rear frame 16 is formed into a box shape having a space thereinside. The box-shaped portion is generally formed of a fiber-reinforced resin. The FRP (fiber-reinforced resin) that forms the rear frame 16 is exemplarily a CFRP (carbon fiber-reinforced resin).

The side covers 51 (only the side cover on one side is depicted) cover the rear frame 16, the one-side muffler 38 (see FIG. 7), and the other-side muffler 39 from lateral sides.

The side cover 51 includes a side cover main unit 81 and a plurality of protrusions 89. The side cover main unit 81 has a substantially rhombus shape in a side view. The protrusions 89 are bonded by adhesion to a back surface of the side cover main unit 81. The side cover main unit 81 has, on the obverse side, a surface 81y that is a smooth surface with no irregularities except for an upper mounting portion 81p to be described later.

In a side view, the side cover main unit 81 has an upper hem 81a and a lower hem 81b. The side cover main unit 81 is mounted on the rear frame 16 so as to have a longitudinal direction extending upwardly toward the rear.

The upper hem 81a includes an upper hem bent portion 81c, a front upper hem 81d, and a rear upper hem 81e. The upper hem bent portion 81c is bent so as to protrude upwardly at a central portion in the anterior-posterior direction. The front upper hem 81d extends from the upper hem bent portion 81c downwardly toward the front. The rear upper hem 81e extends from the upper hem bent portion 81c upwardly toward the rear. The lower hem 81b includes a lower hem first bent portion 81f, a lower hem second bent portion 81g, a front lower hem 81h, an intermediate lower hem 81j, and a rear lower hem 81k. The two bent portions of the lower hem first bent portion 81f and the lower hem second bent portion 81g are bent so as to protrude downwardly. The front lower hem 81h extends from the lower hem first bent portion 81f to the front substantially horizontally. The intermediate lower hem 81j extends from the lower hem first bent portion 81f upwardly toward the rear. The rear lower hem 81k extends from the lower hem second bent portion 81g upwardly toward the rear.

The side cover main unit 81 includes a front end mounting portion 81n and the upper mounting portion 81p. The front end mounting portion 81n is formed at a front end portion 81m of the front upper hem 81d. The upper mounting portion 81p is formed below the upper hem bent portion 81c. The front end mounting portion 81n protrudes upwardly and is attached to a front lower portion of the rear frame 16. The upper mounting portion 81p is attached to a lateral wall 70 of the rear frame 16 by a bolt 59.

The side cover main unit 81 has a rear end portion 81q that assumes a free end not fixed to the vehicle body side. The rear end portion 81q is disposed laterally outside the rear fender 54.

A distance L7 in the anterior-posterior direction between the upper mounting portion 81p and the front end portion 81m is shorter than a distance L8 in the anterior-posterior direction between the upper mounting portion 81p and the rear end portion 81q. From the foregoing, the rear end portion 81q of the side cover main unit 81 tends to flex when an external force acts thereon from the outside in the vehicle width direction.

Additionally, both the front end mounting portion 81n and the upper mounting portion 81p are disposed close to the upper hem 81a of the side cover main unit 81. This arrangement results in the lower hem 81b side of the side cover main unit 81 tending to flex.

In the present embodiment, the side cover main unit 81 is formed of a FRP, e.g., CFRP to achieve enhanced strength when an external force acts repeatedly on the side of the rear end portion 81q or the lower hem 81b of the side cover main unit 81. Moreover, the present embodiment allows for the direction of fibers for greater flexibility to achieve enhanced durability.

The CFRP of which the side cover main unit 81 is formed is, for example, a cloth that is identical to the cloth 69 (see FIG. 9) forming the shroud main unit 56 (see FIG. 3), impregnated with a resin, and heated and cured.

The broken lines extending in the anterior-posterior direction and the superior-inferior direction in the side cover main unit 81 each represent the warp thread 69a and the filling thread 69b formed of a carbon fiber. The bisector 69c is drawn with a broken line so as to divide an angle formed between the warp thread 69a and the filling thread 69b into two equal parts.

Draw a line segment 99 that connects between the upper mounting portion 81p and the rear end portion 81q of the side cover main unit 81. At this time, the bisector 69c is disposed to extend along the line segment 99. The direction in which the line segment 99 extends corresponds to the longitudinal direction of the side cover main unit 81. Thus, the bisector 69c is disposed to extend along the longitudinal direction of the side cover main unit 81.

Another bisector different from the bisector 69*c*, specifically, the bisector 69*d* is drawn with a broken line so as to divide the angle formed between the warp thread 69*a* and the filling thread 69*b* into two equal parts. The bisector 69*d* is orthogonal to the bisector 69*c*.

Disposing the bisectors 69*c* and 69*d* as described above allows the rigidity of the side cover main unit 81 to be prevented from increasing excessively in the directions extending along the bisectors 69*c* and 69*d*, and the side cover main unit 81 can be made to tend to flex in the directions extending along the bisectors 69*c* and 69*d*. Fatigue strength can thus be enhanced even when an external force acts repeatedly on the side cover main unit 81.

The protrusions 89 are disposed so as to overlap, in a side view, the one-side muffler 38 and the other-side muffler 39 and so as to be brought into abutment on lateral surfaces of the one-side muffler 38 and the other-side muffler 39. The protrusions 89 are formed of a heat-resistant resin that does not include fibers. It is noted that the protrusions 89 may nonetheless be formed of a fiber-reinforced resin that includes fibers (e.g., the same material as that used for the side cover main unit 81).

Figure 7:
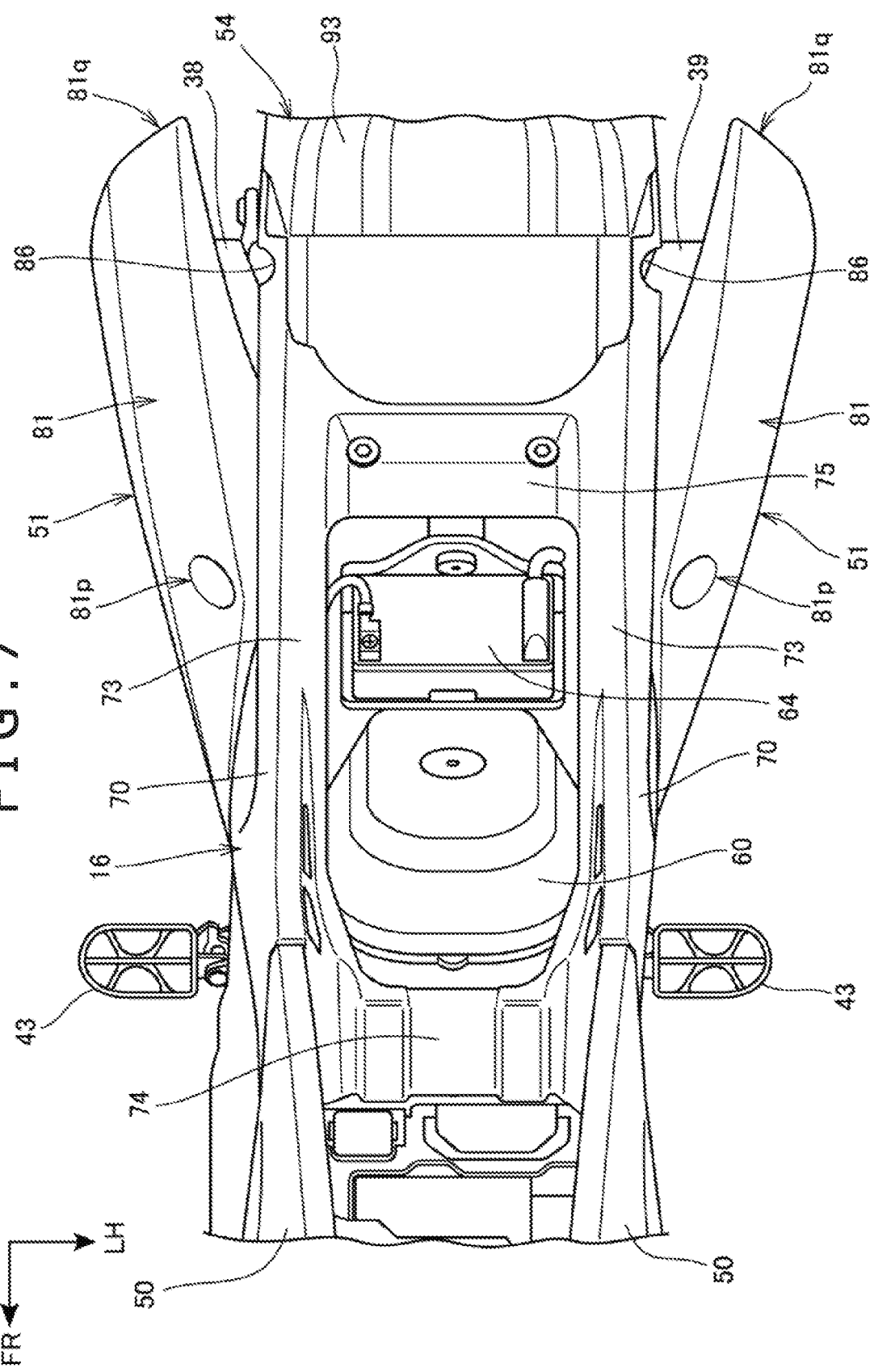
FIG. 7 is a plan view depicting a rear part of the motorcycle.

FIG. 7 is a plan view depicting a rear part of the motorcycle 1.

The rear frame 16 includes a pair of left and right lateral walls 70, a pair of left and right upper side portions 73, a front cross member 74, and a rear cross member 75. The lateral walls 70 are disposed to be spaced apart from each other in the vehicle width direction. The upper side portions 73 extend from upper edges of the lateral walls 70 inwardly in the vehicle width direction. The front cross member 74 connects the upper side portions 73 in the vehicle width direction at the front portion of the rear frame 16. The rear cross member 75 connects the upper side portions 73 in the vehicle width direction at the rear portion of the rear frame 16.

The lateral walls 70, the upper side portions 73, the front cross member 74, and the rear cross member 75 are each formed of a FRP, for example, a CFRP.

The left and right lateral walls 70 of the rear frame 16 extends in the anterior-posterior direction along lateral edges of the seat 13 (see FIG. 2).

The left and right side covers 51 are formed so as to gradually extend outwardly in the vehicle width direction toward the rear of the vehicle. The rear end portions 81*q* of the side covers 51 extend farther toward the rear than rear end portions of the left and right lateral walls 70 of the rear frame 16 and are gradually spaced apart from the respective lateral walls 70 and the rear fender 54.

The side covers 51, or more specifically, the rear end portions 81*q* of the side cover main units 81 protrude largely to the outside in the vehicle width direction. As a result, an external force tends to act on the rear end portions 81*q*, so that the rear end portions 81*q* are susceptible to repeated load. Because of the FRP (e.g., CFRP) used to form the side cover main units 81 as noted previously, however, durability can be enhanced.

FIG. 8 is a cross-sectional view taken along line VIII-VIII in FIG. 6, depicting a cross section of the protrusion 89.

The protrusion 89 is a hollow structure having an outer peripheral wall 89*a* and an inner wall 89*c* formed integrally with each other. The outer peripheral wall 89*a* is bonded with a back surface 81*r* of the side cover main unit 81. The inner wall 89*c* is disposed on an inner edge on the inside in the vehicle width direction of the outer peripheral wall 89*a*.

An outer edge 89*d* on the outside in the vehicle width direction of the outer peripheral wall 89*a* is bonded with the back surface 81*r* of the side cover main unit 81. The inner wall 89*c* has an abutment surface 89*e* that is brought into abutment with an outer lateral surface 39*a* of the other-side muffler 39 (or the outer lateral surface of the one-side muffler 38 (see FIG. 7)). Having the abutment surface 89*e* allows a surface pressure between the outer lateral surface 39*a* of the other-side muffler 39 (or the outer lateral surface of the one-side muffler 38) and the abutment surface 89*e* to be reduced, so that the abutment surface 89*e* can be prevented from being deformed or worn. Additionally, the protrusion 89, because of the hollow structure, can be built lightweight and built to offer high rigidity and high heat insulting performance.

Figure 9:
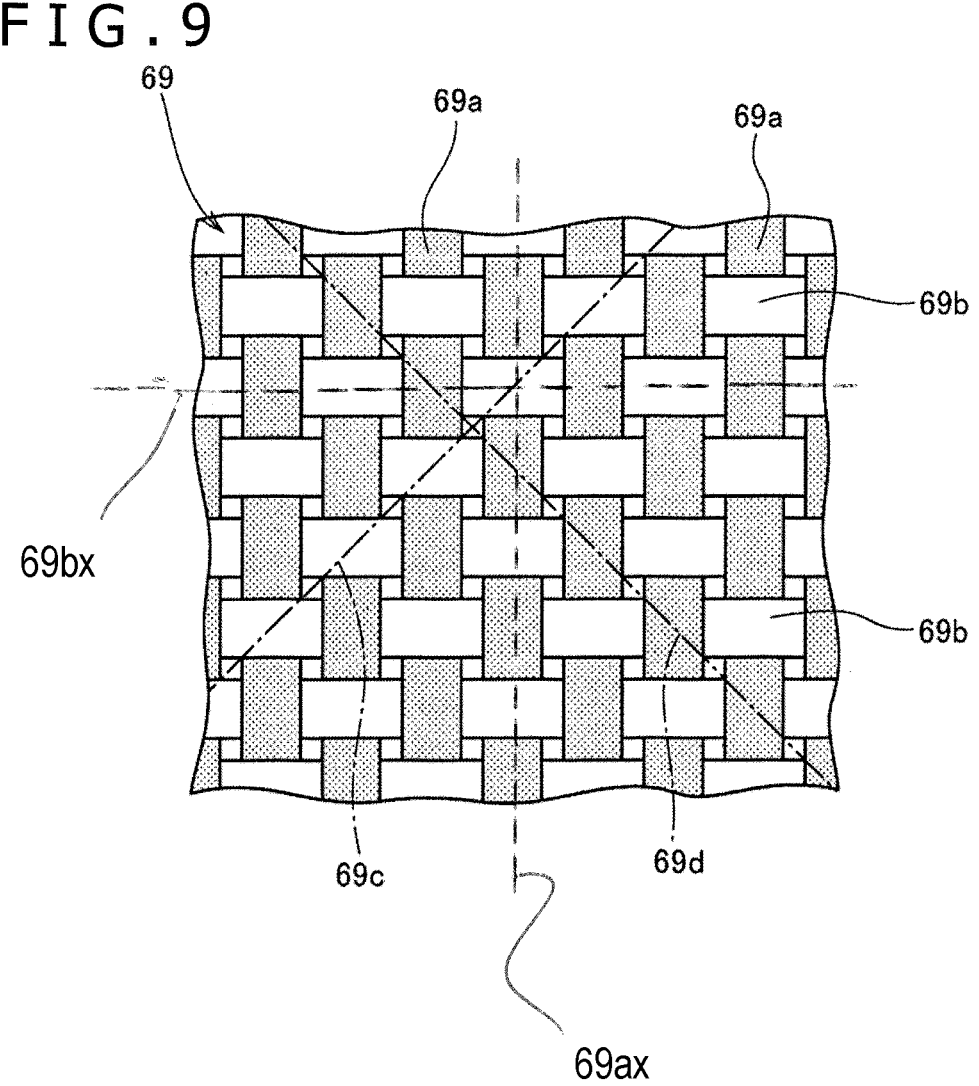
FIG. 9 is a view depicting a cloth formed of a FRP (carbon fiber-reinforced plastic (CFRP)).

FIG. 9 is a view depicting the cloth 69 formed of a FRP (CFRP). The cloth 69 is plainly woven from the warp threads 69*a* and the filling threads 69*b* that are each fibers (carbon fibers) bundled together. It is noted that, for the sake of clarity in identifying the warp thread 69*a* and the filling thread 69*b*, FIG. 9 depicts the warp threads 69*a* by a dot pattern. Each of the warp threads 69*a* and each of the filling threads 69*b* can be represented by a line passing through a corresponding longitudinal axis 69*ax* or 69*bx* thereof. It will be understood that each of the warp threads 69*a* and each of the filling threads 69*b* will have a corresponding longitudinal axis 69*ax* or 69*bx*, similar to those shown. The angle formed between a first longitudinal axis, such as that shown at 69*ax*, of any selected warp thread 69*a* and a second longitudinal axis, such as that shown at 69*bx*, of any selected filling thread 69*b* is 90 degrees, as shown. The bisectors 69*c* and 69*d* that each divide the angle, formed between the respective longitudinal axes of the warp thread 69*a* and the filling thread 69*b*, into two equal parts, are each respectively inclined at 45 degrees with respect to the warp thread 69*a* and the filling thread 69*b*. The cloth 69 has a high rigidity in directions in which the warp thread 69*a* and the filling thread 69*b* extend, but has a lower rigidity, and can be more easily flexed, in directions in which the bisectors 69*c* and 69*d* extend. The present embodiment uses the property of the reduced rigidity in the directions in which the bisectors 69*c* and 69*d* extend (tendency toward flexing) to enhance the durability of the vehicle body covers (the radiator shroud 50 and the side cover 51).

As depicted in FIGS. 3 and 9, the vehicle body cover structure for the motorcycle 1 as a saddled vehicle includes the radiator shroud 50 as a vehicle body cover formed of the fiber-reinforced resin covering the outside of the vehicle body. The fiber-reinforced resin is formed of the cloth 69 woven from the warp threads 69*a* and the filling threads 69*b* formed of fibers. The cloth 69 is disposed on the radiator shroud 50. The cloth 69 has disposed thereon the bisector 69*c* that divides the angle formed between the warp thread 69*a* and the filling thread 69*b* into two equal parts. The bisector 69*c* is disposed so as to extend along the line segment 78 that connects between the third mounting portion 56*t* as a fixing portion fixed to the vehicle body side and the front end portion 56*v* as a vehicle body cover end portion farthest from the third mounting portion 56*t*.

Additionally, the radiator shroud 50 has the surface 56*y* that extends in the longitudinal direction. The cloth 69 is disposed on the radiator shroud 50 such that the bisector 69*c* that divides the angle formed between the warp thread 69*a* and the filling thread 69*b* into two equal parts and that is disposed on the cloth 69 extends in the longitudinal direction of the surface 56*y*.

The foregoing arrangement can prevent rigidity of the radiator shroud 50 from excessively increasing, while enhancing strength of the radiator shroud 50 through the use of the fiber-reinforced resin, thereby improving durability of the radiator shroud 50 and vehicle running performance.

The vehicle body cover includes the radiator shroud 50 that covers the outside of the radiator 41. The radiator shroud 50 includes the third mounting portion 56*t* disposed at a rear portion thereof. The third mounting portion 56*t* is fixed to the vehicle body side. The radiator shroud 50 further includes the front end portion 56*v* that serves as a free end disposed at a position spaced away downwardly toward the front from the third mounting portion 56*t*.

The foregoing arrangement promotes deformation of a portion in the radiator shroud 50 on the side closer to the front end portion 56*v* relative to the third mounting portion 56*t* when an external force is applied to the portion on the side closer to the front end portion 56*v* relative to the third mounting portion 56*t*. Thus, durability of the radiator shroud 50 can be improved even when an external force is repeatedly applied to the portion on the side closer to the front end portion 56*v* relative to the third mounting portion 56*t*.

In addition, as depicted in FIGS. 6 and 9, the vehicle body cover includes the side cover 51 disposed on the lateral side below the seat 13. The side cover 51 includes the upper mounting portion 81*p* formed at an upper portion thereof. The upper mounting portion 81*p* serves as a fixing portion fixed to the vehicle body side. The side cover 51 extends from the upper mounting portion 81*p* upwardly toward the rear to thereby cover the outside of the one-side muffler 38 (and the other-side muffler 39). The side cover 51 further includes the rear end portion 81*q* as a vehicle body cover end portion. The rear end portion 81*q* that serves as a free end is disposed at a position spaced away upwardly toward the rear from the upper mounting portion 81*p*.

The foregoing arrangement promotes deformation of a portion in the side cover 51 on the side closer to the rear end portion 81*q* relative to the upper mounting portion 81*p* when an external force is applied to the portion on the side closer to the rear end portion 81*q* relative to the upper mounting portion 81*p*. Thus, durability of the side cover 51 can be improved even when an external force is repeatedly applied to the portion on the side closer to the rear end portion 81*q* relative to the upper mounting portion 81*p*.

Additionally, the surface 81*y* extending longitudinally upwardly toward the rear from the upper mounting portion 81*p* is defined as the surface 81*y* extending in the longitudinal direction. The foregoing arrangement can prevent rigidity of the side cover 51 from increasing excessively when flexure occurs in the longitudinal direction of the side cover 51, so that durability of the side cover 51 can be enhanced.

Additionally, the side cover 51 further includes the front end mounting portion 81*n* formed at an upper portion at the front end portion thereof. The front end mounting portion 81*n* serves as a front end fixing portion fixed to the vehicle body side. The cloth 69 is disposed, in which the bisector 69*d* as an orthogonal bisector that is orthogonal to the bisector 69*c* is disposed in the direction extending downwardly toward the rear from the upper mounting portion 81*p*. The foregoing arrangement results in the bisector 69*d* being disposed in the direction in which the side cover 51 tends to flex, so that the side cover 51 can readily flex for the enhanced durability.

It is understood that the embodiment described above is for illustrative purposes only and various modifications and alterations of the present invention will be apparent to those skilled in the art without departing from the present invention.

For example, the embodiment described above incorporates the cloth 69 (see FIG. 9) formed of an identical CFRP to constitute the radiator shroud 50 and the side cover 51 depicted in FIGS. 3 and 6. The arrangement is nonetheless illustrative only and a different cloth may be used between the radiator shroud 50 and the side cover 51 (for example, different fiber thickness or different weave).

Any CFRP manufacturing method may be employed other than the one described above. Additionally, the CFRP cited in the present embodiment is illustrative only and a FRP (fiber-reinforced resin) that includes any other type of fibers may be used.

The present invention is applicable to, not only the motorcycle 1, but also a saddled vehicle including any type of vehicle other than the motorcycle 1. It is noted that the saddled vehicle includes general types of vehicles that include vehicle bodies straddled by the operator, including three-wheeled vehicles and four-wheeled vehicles classified as all-terrain vehicles (ATVs), in addition to the motorcycles (including motor-assisted bicycles).

DESCRIPTION OF REFERENCE SYMBOLS

1 Motorcycle (Saddled vehicle)
38 One-side muffler (Muffler)
39 Other-side muffler (Muffler)
41 Radiator
50 Radiator shroud (Vehicle body cover)
51 Side cover (Vehicle body cover)
56*t* Third mounting portion (Fixing portion)
56*v* Front end portion (Vehicle body cover end portion)
56*y*, 81*y* Surface on obverse side (Surface)
69, 98 Cloth
69*a*, 69*a* Warp thread
69*b*, 69*b* Filling thread
69*c* Bisector
69*d* Bisector (Orthogonal bisector)
78, 99 Line segment
81*n* Front end mounting portion (Front end fixing portion)
81*p* Upper mounting portion (Fixing portion)
81*q* Rear end portion (Vehicle body cover end portion)

The invention claimed is:

1. A vehicle body cover structure for a saddled vehicle, comprising:
vehicle body covers formed of a fiber-reinforced resin for covering an outside portion of a vehicle body, the fiber-reinforced resin being formed of a cloth woven from warp threads and filling threads formed of fibers, wherein
the vehicle body covers have the cloth disposed thereon, the cloth having the fibers disposed and oriented thereon in a manner such that line segments that connect between fixing portions, configured to be fixed to a vehicle body side, and vehicle body cover end portions that are farthest from the fixing portions, are not aligned with directions in which the warp thread and the filling thread extend, wherein a first bisector divides an angle formed between the warp threads and the filling threads into two equal parts, the first bisector being disposed so as to be substantially aligned with the line segments.

2. The vehicle body cover structure for a saddled vehicle according to claim 1, wherein:
the vehicle body cover is a radiator shroud that covers an outside of a radiator, and
the radiator shroud includes, at a rear portion thereof, one of the fixing portions configured to be fixed to the vehicle body side and has, at a position spaced away downwardly toward a front from the fixing portion, one of the vehicle body cover end portions as a free end.

3. The vehicle body cover structure for a saddled vehicle according to claim 2, wherein a distance in an anterior-posterior direction, between the fixing portion to be fixed to the vehicle body side and the vehicle body cover end portion, is substantially equal to a distance in the anterior-posterior direction between the fixing portion and a rear end portion of the radiator shroud.

4. The vehicle body cover structure for a saddled vehicle according to claim 1, wherein the vehicle body cover has a surface that extends in a opposite direction to one of the vehicle body cover end portions farthest from the fixing portion configured to be fixed to the vehicle body side.

5. The vehicle body cover structure for a saddled vehicle according to claim 4, wherein a distance, in an anterior-posterior direction, between said one of the fixing portions of the vehicle body cover configured to be fixed to the vehicle body side and a front one of the vehicle body cover end portions, is substantially equal to a distance in the front-to-rear direction between the fixing portion and a rear end portion.

6. The vehicle body cover structure for a saddled vehicle according to claim 4, wherein a distance, in an anterior-posterior direction, between an upper mounting portion of the vehicle body cover and a front end portions is shorter than a distance in the anterior-posterior direction between the upper mounting portion and a rear end portion.

7. The vehicle body cover structure for a saddled vehicle according to claim 1, wherein:
the vehicle body cover has a surface that extends in an opposite direction to one of the vehicle body cover end portions farthest from one of the fixing portions configured to be fixed to the vehicle body side,
the surface that extends in the opposite direction is disposed laterally of the seat,
and said one of the fixing portions is disposed at a front side of the seat.

8. A vehicle body cover structure for a saddled vehicle, comprising:
vehicle body covers formed of a fiber-reinforced resin covering an outside of a vehicle body, the fiber-reinforced resin being formed of a cloth woven from warp threads and filling threads formed of fibers, wherein
the vehicle body covers have surfaces that extend in a longitudinal direction of the vehicle body covers, wherein a longitudinal direction of the surfaces is the same as the longitudinal direction of the vehicle body covers, the fibers of the cloth being disposed and oriented on the vehicle body covers such that the longitudinal direction of the surfaces is not aligned with directions in which the warp thread and the filling thread extend, wherein a first bisector, that divides an angle formed between the warp threads and the filling threads into two equal parts and that is disposed on the cloth, extends in the longitudinal direction of the surfaces.

9. The vehicle body cover structure for a saddled vehicle according to claim 8, wherein the vehicle body cover is a radiator shroud that covers an outside of a radiator, and the radiator shroud includes, at a rear portion thereof, a fixing portion configured to be fixed to a vehicle body side portion and has, at a position spaced away downwardly toward a front from the fixing portion, a vehicle body cover end portion as a free end.

* * * * *